(12) United States Patent
Watanabe et al.

(10) Patent No.: US 11,219,883 B2
(45) Date of Patent: Jan. 11, 2022

(54) AG—PD CORE-SHELL PARTICLE AND USE THEREOF

(71) Applicant: NORITAKE CO., LIMITED, Nagoya (JP)

(72) Inventors: Yoshiki Watanabe, Nagoya (JP); Keiko Ohta, Nagoya (JP); Yukiko Kikugawa, Nagoya (JP)

(73) Assignee: NORITAKE CO., LIMITED

(*) Notice: Subject to any disclaimer, the term of this patent is extended or adjusted under 35 U.S.C. 154(b) by 188 days.

(21) Appl. No.: 16/599,901

(22) Filed: Oct. 11, 2019

(65) Prior Publication Data

US 2020/0122124 A1  Apr. 23, 2020

(30) Foreign Application Priority Data

Oct. 18, 2018 (JP) .............................. JP2018-196532

(51) Int. Cl.
| | | |
|---|---|---|
| *B01J 23/50* | (2006.01) | |
| *B01J 35/00* | (2006.01) | |
| *B01J 31/06* | (2006.01) | |
| *H01B 1/02* | (2006.01) | |
| *B01J 37/04* | (2006.01) | |
| *B01J 37/00* | (2006.01) | |
| *B01J 37/02* | (2006.01) | |
| *B01J 35/02* | (2006.01) | |

(52) U.S. Cl.
CPC .............. *B01J 23/50* (2013.01); *B01J 31/06* (2013.01); *B01J 35/0033* (2013.01); *B01J 35/026* (2013.01); *B01J 37/0072* (2013.01); *B01J 37/0221* (2013.01); *B01J 37/04* (2013.01); *H01B 1/02* (2013.01)

(58) Field of Classification Search
CPC ........ B01J 23/50; B01J 31/06; B01J 35/0033; B01J 35/026; B01J 37/0072; B01J 37/0221; B01J 37/04; H01B 1/02; C01P 2004/03; C01P 2004/61; C01P 2004/90; C01P 2006/90
USPC .......... 502/167, 330, 347; 75/255, 331, 351; 977/710; 428/402, 403, 570
See application file for complete search history.

(56) References Cited

U.S. PATENT DOCUMENTS

| 8,110,521 | B2* | 2/2012 | Lee .......................... H01M 4/90 502/185 |
| 11,008,470 | B2 | 5/2021 | Watanabe et al. |
| 2001/0004857 | A1 | 6/2001 | Sasaki |
| 2009/0108752 | A1 | 4/2009 | Matsuno et al. |
| 2013/0313490 | A1 | 11/2013 | Eiden et al. |
| 2019/0079014 | A1* | 3/2019 | Duan ..................... G01N 21/648 |
| 2020/0308422 | A1* | 10/2020 | Watanabe ................ B01J 13/06 |

FOREIGN PATENT DOCUMENTS

| JP | 4059904 | 2/1992 |
| JP | 6122905 | 5/1994 |
| JP | 8176605 | 7/1996 |
| JP | 2005105376 | 4/2005 |
| JP | 2006307330 | 11/2006 |
| JP | 2008274424 | 11/2008 |
| JP | 5535507 | 7/2014 |
| JP | 5572712 | 8/2014 |
| JP | 5946463 | 7/2016 |
| WO | 2011031118 | 3/2011 |
| WO | 2012055758 | 5/2012 |

OTHER PUBLICATIONS

Wafa I. Abdel-Fattah et al., "Synthesis of biogenic Ag@Pd Core-shell nanoparticles having anti-cancer/anti-microbial functions." Life Sciences 183, pp. 28-36. (Year: 2017).*
Brendan Farrell et al., "Alloy and Core-Shell Silver/Palladium Platelets for Ultra-Low Fire MLCC's." Center for Advanced Materials Processing; pp. 1-9. (Year: 2007).*
Watanabe, Yoshiki; Requirement for Restriction/Election for U.S. Appl. No. 16/599,968, filed Oct. 11, 2019, dated Jun. 17, 2020, 6 pgs.
Kobunshi Ronbunshu; Article entitled: "Hydrogenation of 1,3-Cyclooctadiene Using Colloidal Dispersion Catalysts of Ultrafine Rhodium and Palladium Particles Protected by Poly(N-vinyl-2-pyrrolidone)", vol. 46, No. 9, p. 551-558, Sep. 1989, 8 pgs.
Nature Nanotechnology; Article entitled: "Hydrogen Production from Formic Acid at Room Temperature over Ag Core-Pd Shell Nano-catalyst," published Apr. 10, 2011, 14 pgs.
The 9th Annual Meeting of Japan Society for Molecular Science, Article entitled: "Hydrogen Generation through Decomposition of Formic Acid using TiO2 supported Ag@Pd Core-shell Nanocatalysts", presented on Aug. 31, 2015, 3 pgs.
Watanabe, Yoshiki; Non-Final Office Action for U.S. Appl. No. 16/599,968, filed Oct. 11, 2019, dated Sep. 30, 2020, 16 pgs.
Watanabe, Yoshiki; Notice of Allowance for U.S. Appl. No. 16/599,968, filed Oct. 11, 2019, dated Jan. 19, 2021, 7 pgs.

* cited by examiner

*Primary Examiner* — Patricia L. Hailey
(74) *Attorney, Agent, or Firm* — Taylor English Duma LLP

(57) ABSTRACT

The manufacturing method provided by the present invention provides a powder material substantially comprising Ag—Pd core-shell particles consisting of Ag core particles containing silver as a principal constituent element and a Pd shell containing palladium as a principal constituent element covering at least part of the surface of the Ag core particles, wherein hydroquinone and/or a quinone is attached to the surface of the Ag—Pd core-shell particles.

Typically, when the powder material is in a dispersed state in a specific medium, a Z average particle diameter ($D_{DLS}$) based on the dynamic light scattering (DLS) method is 0.1 μm to 2 μm, and the polydispersity index (PDI) based on the dynamic light scattering method is 0.4 or lower.

11 Claims, 16 Drawing Sheets

Ag La1

Pd La1

Ag Lαl

Pd Lαl

Ag Lα1

Pd Lα1

AG—PD CORE-SHELL PARTICLE AND USE THEREOF

CROSS-REFERENCE TO RELATED APPLICATIONS

The priority claim for the present application is based on Japanese Patent Application No. 2018-196532 submitted on Oct. 18, 2018, and the entire contents of that application are herein incorporated by reference.

TECHNICAL FIELD

The present invention relates to Ag—Pd core-shell particles comprising Ag particles (Ag core) having silver (Ag) as a principal constituent element and a Pd shell having palladium (Pd) as a principal constituent element on the surface of the Ag particles, and to a method for manufacturing the same. The present invention also relates to a powder material comprising primarily of the Ag—Pd core-shell particles, and to a paste (slurry) material comprising this powder material dispersed in a medium.

TECHNICAL BACKGROUND

In recent years, core-shell particles are being used in various industrial fields in order to confer functionality, reduce costs and the like. In the fields of conductive pastes, catalysts and the like for example, Ag—Pd core-shell particles are being developed comprising Pd shells having Pd as a principal constituent element formed on the surface of Ag cores having Ag as a principal constituent element. Patent Literature 1 (Japanese Patent Application Publication No. H08-176605) describes a method for adding a reducing agent to an aqueous solution of silver ammine chloride to form silver particles, and then covering silver particles with palladium to manufacture a palladium coated silver powder.

However, along with recent demands for smaller electronic parts and thinner electrodes, the powder materials for conductive pastes (paste or slurry compositions for forming electrode films and the like) are now required to have sharper particle size distributions and smaller particle diameters of the metal particles that are the principal constituents of these powder materials. Thus, when Ag—Pd core-shell particles are used as the principal constituent of a powder material for a conductive paste, there is a strong emphasis on controlling the particle diameter of the core-shell particles in the sub-micron range while maintaining a sharp particle size distribution.

When such core-shell particles have been manufactured by conventional methods, however, agglomeration and linking (necking) has occurred between core-shell particles (typically between primary particles) after manufacture, resulting in the formation of large quantities of secondary particles such as large agglomerates and linked (necked) clumps with large particle diameters. Because multiple primary particles are fixed together by their shells, these secondary particles are too strong to be broken up, so that the particle diameter of the resulting secondary particles is much greater than the particle diameter of the cores of the primary particles, and there is much greater variation in particle diameter. For example, in the technology disclosed in Patent Literature 1, it is difficult to control linking by the Pd shells. According to Patent Literature 1, a palladium coated silver powder (core-shell particles) is formed with an average particle diameter of about 0.4 μm. However, the average particle diameter described in Patent Literature 1 is the particle diameter as evaluated by scanning electron microscopy (SEM), and it is thought that the particle diameter of the primary particles was measured. When powder materials containing core-shell particles have actually been manufactured, a problem has occurred in which multiple primary particles have become fixed to form large quantities of secondary particles.

Meanwhile, Non-Patent Literature 1 (Bin Zhao and Naoki Toshima, Japanese Journal of Polymer Science and Technology, Vol. 46 (1989) No. 9, p. 551) presents technology for decreasing the particle diameter of metal particles contained in a powder material. This Non-Patent Literature 1 discloses a technology for producing ultrafine metal particles with a surface protected by polyvinylpyrrolidone (PVP) by precipitating metal particles (Rh, Pd or the like) in the presence of PVP. Thus, Non Patent Literature 1 shows that PVP has the effect of precipitating metals as fine particles.

Non Patent Literature 2 (Proceedings of the 2015 Annual Meeting of the Japan Society for Molecular Science, 2P077) and Non Patent Literature 3 (Nature Nanotechnology 6, 302 (2011), Supplementary information) disclose technologies that use such PVP in the manufacture of core-shell particles. For example, in Non-Patent Literature 2 a solution is first prepared by dissolving silver nitrate and PVP, and Ag is precipitated from this solution to produce Ag core particles. Palladium nitrate is then dissolved in a liquid dispersion containing the Ag core particles, after which Pd is precipitated to form a Pd shell on the surface of the Ag core particles. In this Non-Patent Literature 2, the average particle diameter of Ag—Pd fine particles (core-shell particles) obtained by this process is described as being about 5.0 nm.

SUMMARY OF THE INVENTION

However, the problem is that when the technologies described in the above Non-Patent Literature 2 and 3 are actually used, large quantities of fine individual Pd particles are likely to be formed. Specifically, when the dispersion states of the Ag element and Pd element are confirmed by FE-SEM and EDX element mapping in Non-Patent Literature 2 and 3, large quantities of individual Pd particles have been produced. Because it is extremely difficult to extract only core-shell particles from a powder material containing such large quantities of individual Pd particles, the percentage of core-shell particles (yield of core-shell particles) in the manufactured powder material is greatly reduced when the manufacturing steps of the methods of Non Patent Literature 2 and 3 above are actually applied, and consequently the characteristics peculiar to core-shell particles are not fully realized, and manufacturing efficiency may decline.

It is therefore a principal object of the present invention, which was developed in light of the conventional problems that occur when manufacturing Ag—Pd core-shell particles as described above, to provide a technology capable of efficiently yielding Ag—Pd core-shell particles in which the particle diameter of the core-shell particles is controlled in the sub-micron range by appropriately controlling the formation of secondary particles by particle fixing without reducing the yield of Ag—Pd core-shell particles. Another object is to provide a powder material comprised primarily of such Ag—Pd core shell particles, as well as a paste (slurry) material comprising this powder material dispersed in a specific dispersion medium.

To achieve these objects, the present invention provides a method for manufacturing Ag—Pd core-shell particles. That is, the manufacturing method disclosed here is a method for manufacturing Ag—Pd core-shell particles consisting of Ag core particles containing silver as a principal constituent element and a Pd shell containing palladium as a principal constituent element covering at least part of the surface of the Ag core particles, the method comprising:

a step of preparing a first reaction solution containing a silver compound for constituting the Ag core particles;

a step of producing Ag core particles containing the silver contained in the reaction solution as a principal constituent element by adding a first reducing agent to the first reaction solution to perform reduction treatment, wherein the first reducing agent contains at least hydroquinone;

a step of preparing a second reaction solution by adding a palladium compound for constituting the Pd shell to a dispersion solution of the resulting Ag core particles in a dispersed state; and a step of forming a Pd shell containing palladium as a principal constituent element on the surface of the Ag core particles in the reaction solution by adding a second reducing agent to the second reaction solution to perform reduction treatment.

The inventors perfected the present invention after discovering that if hydroquinone is included when adding a reducing agent to a first reaction solution containing a silver compound as a raw material for producing Ag core particles to thereby reduce the silver compound and produce Ag core particles, hydroquinone and/or a quinone will be present on the surface of the resulting Ag core particles.

The term "quinone" as used in this Description includes, but is not limited to, cyclic organic compounds containing two ketone structures (quinone compounds), such as o-benzoquinone, p-benzoquinone, naphthoquinone, anthraquinone and the like. For example, an oxidized derivative or decomposition product of hydroquinone that may be produced in the reaction solution during the reduction treatment is also a substance that may be encompassed by the term "quinone" as used here.

When hydroquinone and/or a quinone attaches to the surface of the resulting Ag core particles, reduction precipitation of Pd ions in the subsequent Pd shell formation step occurs selectively (by preference) on the surface of the Ag core particles. As a result, Ag—Pd core-shell particles can be produced with a high yield by the manufacturing method disclosed here.

Moreover, since reduction precipitation of Pd ions occurs selectively (by preference) on the surface of the Ag core particles, Pd precipitation at points of contact between Ag core particles is also controlled in the Pd shell formation process. As a result, it is possible to prevent agglomeration and necking when forming the Pd shell, and manufacture Ag—Pd core-shell particles with a small particle diameter or with a narrowly controlled particle size distribution.

In a preferred embodiment of the Ag—Pd core-shell particles manufacturing method disclosed here, the first reducing agent also contains polyvinylpyrrolidone (PVP).

PVP is a polymer compound that has a high affinity for both Ag and Pd in the manufacture of Ag—Pd core-shell particles, and also has a high affinity for hydroquinone and quinones. Consequently, if PVP is included in addition to hydroquinone when adding a reducing agent to a first reaction solution containing a silver compound as a raw material for producing Ag core particles to thereby reduce the silver compound and produce Ag core particles, a complex of hydroquinone and/or a quinone and PVP can exist stably on the surface of the resulting Ag core particles. This means that reduction precipitation of Pd ions proceeds selectively (by preference) on the surface of the Ag core particles in the subsequent Pd shell formation step. Thus, Ag—Pd core-shell particles comprising a Pd shell formed as a film with a high coverage rate can be manufactured efficiently by the manufacturing method of this embodiment.

Preferably, the first reducing agent is prepared as an alcohol solution comprising hydroquinone and PVP dissolved in an alcohol solvent, and this prepared first reducing agent is then added to the first reaction solution. Ag core particles having a complex of hydroquinone and/or a quinone and PVP on the surface thereof can be efficiently produced by adding such a reducing agent to perform reduction treatment.

The present invention also provides a powder material manufactured using Ag—Pd core-shell particles favorably produced by the manufacturing method disclosed here. That is, the powder material disclosed here is a powder material substantially comprising Ag—Pd core-shell particles consisting of Ag core particles containing silver as a principal constituent element and a Pd shell containing palladium as a principal constituent element covering at least part of the surface of the Ag core particles, wherein hydroquinone and/or a quinone is attached to the surface of the Ag—Pd core-shell particles.

As discussed above, with the manufacturing method disclosed here the powder material is substantially comprising the Ag—Pd core-shell particles because the Ag—Pd core-shell particles can be manufactured with high efficiency. "Substantially comprising" here means that the abundance ratio of the Ag—Pd core-shell particles is remarkable, and typically means that the at least 80% by number, or preferably at least 90% by number (or at least 95% by number) of the total particles containing Ag cores in the powder material are Ag—Pd core-shell particles.

Because a powder material of this composition has a high content of Ag—Pd core-shell particles with a high coverage rate by the highly catalytic Pd shell, it has various advantages as enumerated below in comparison with a mixed powder material of Ag particles and Pd particles, or a powder material with a relatively high content of Ag particles and Pd particles (a relatively low content of Ag—Pd core-shell particles) as in conventional powder materials of this type.

(1) Because of the high coverage rate by the high-melting-point Pd shell, it is easy to control the heat resistance and sintering behavior of the metal particles, and form a uniform Ag—Pd alloy sintered film (conductive film) with few defects.

(2) Because the surface of the particles is covered at a high rate by the chemically stable Pd shell, oxidation and other changes over time to the particle surface can be suppressed. This contributes to improving the storage stability of the powder material and paste materials and the like containing the powder material.

(3) Because the surface of the particles is covered at a high rate by the chemically stable Pd shell, Pd catalytic activity can be effectively realized without using a large quantity of expensive Pd. For example, organic components such as binder resins and vehicles are effectively burned off when sintering a coated film of a paste containing the powder material, which contributes to reducing carbon residue. Catalytic activity (for example, ligand effects or coherent effects) due to interactions between different kinds of metals can also be improved.

In a preferred embodiment of the powder material disclosed here, when the powder material is dispersed in a specific medium (here and below, typically water, dimethyl formamide (DMF), ethylene glycol (EG), isobornyl acetate (IBA) or the like), the Z average particle diameter ($D_{DLS}$)

based on the dynamic light scattering (DLS) method is 0.1 μm to 2 μm, and the polydispersity index (PDI) based on the dynamic light scattering method is 0.4 or lower.

More preferably, in a preferred embodiment of the powder material disclosed here the ratio $D_{DLS}/D_{SEM}$ of the Z average particle diameter ($D_{DLS}$) to the average particle diameter ($D_{SEM}$) based on a field emission scanning electron microscope imaging (FE-SEM imaging) is 2 or lower.

In Ag—Pd core-shell particles obtained by the manufacturing method disclosed here, because agglomeration and necking between core-shell particles is suppressed and large-diameter agglomerates and linked clumps are unlikely to form, it is possible to provide a powder material consisting of Ag—Pd core-shell particles with a small particle diameter and a narrowly controlled particle size distribution as discussed above.

In another preferred embodiment of the powder material disclosed here, when the powder material is dispersed in a specific medium, the peak intensity in the peak particle size range of 0.1 μm to 2 μm in a particle size distribution based on an NNLS algorithm using the dynamic light scattering method is at least 80% of the total based on scattering intensity.

With Ag—Pd core-shell particles obtained by the manufacturing method disclosed here, it is thus possible to provide a powder material consisting of Ag—Pd core-shell particles with a narrowly controlled particle size distribution.

In an especially preferred embodiment of the powder material disclosed here, PVP is further attached to the surface of the Ag—Pd core-shell particles.

As discussed above, with a manufacturing method that uses PVP in addition to hydroquinone, it is possible to efficiently manufacture Ag—Pd core-shell particles in which the Pd shell is formed as a film with a high coverage rate. Consequently, the resulting powder material can be used in various industrial fields as a powder material that provides effects such as those listed under (1) to (3) above at a higher level.

As discussed above, a powder material manufactured by the manufacturing method disclosed above and substantially comprising Ag—Pd core-shell particles having various advantages can be used favorably in a variety of fields, but of these, a particularly desirable use is for forming electrode films (conductive films) for electronic products that have become smaller in recent years. Consequently, the present invention also provides a conductive paste (paste composition) comprising any of the powder materials disclosed here together with a medium for dispersing the powder material.

DESCRIPTION OF THE RELATED EMBODIMENTS

Figure 1A:
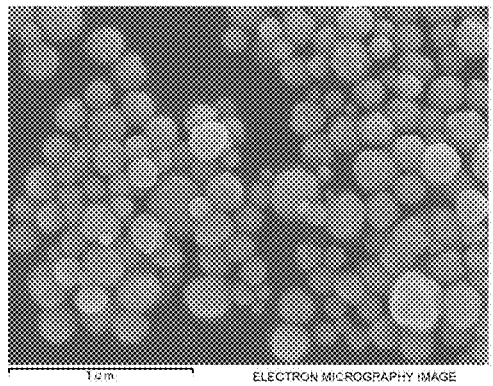
FIG. 1A shows an FE-SEM image and EDX element mapping images of the powder material of Example 1-1, with the upper image being an FE-SEM image, the middle image being an Ag element mapping image and the lower image being a Pd element mapping image.
Figure 1A:
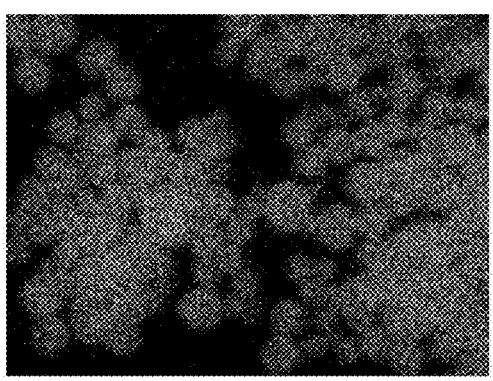
Figure 1A:
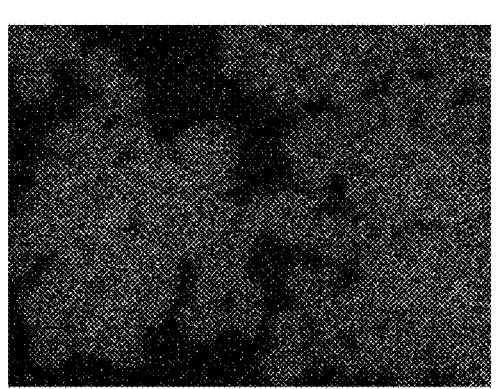
Figure 1B:
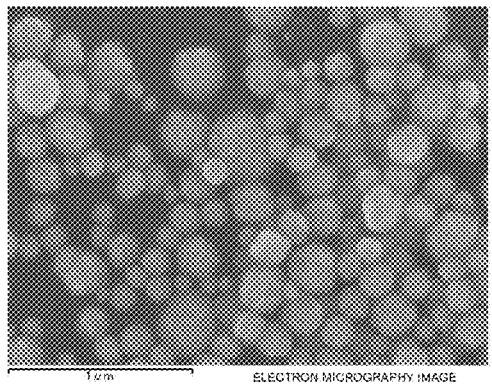
FIG. 1B shows an FE-SEM image and EDX element mapping images of the powder material of Example 1-2, with the upper image being an FE-SEM image, the middle image being an Ag element mapping image and the lower image being a Pd element mapping image.
Figure 1B:
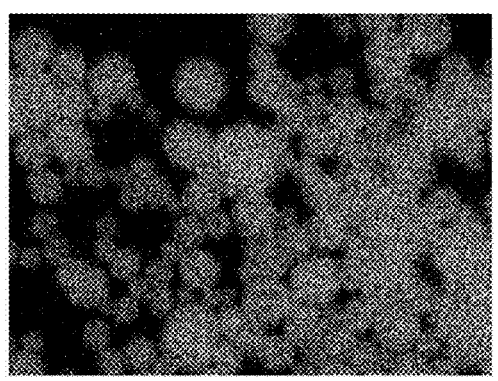
Figure 1B:
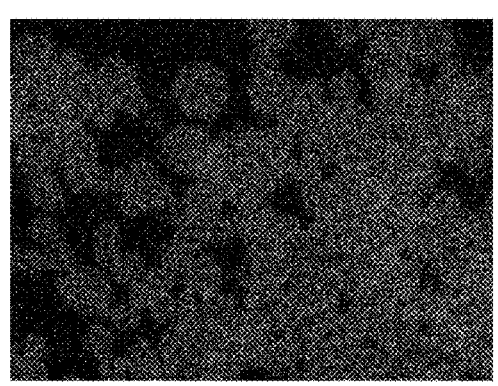
Figure 1C:
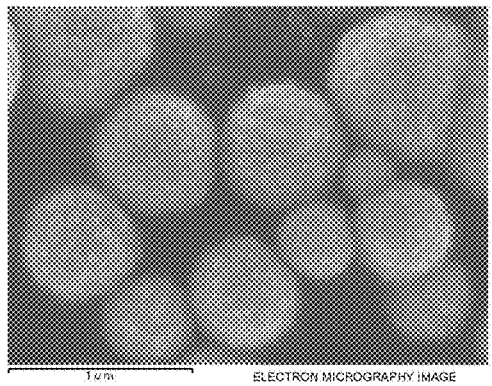
FIG. 1C shows an FE-SEM image and EDX element mapping images of the powder material of Example 2-1, with the upper image being an FE-SEM image, the middle image being an Ag element mapping image and the lower image being a Pd element mapping image.
Figure 1C:
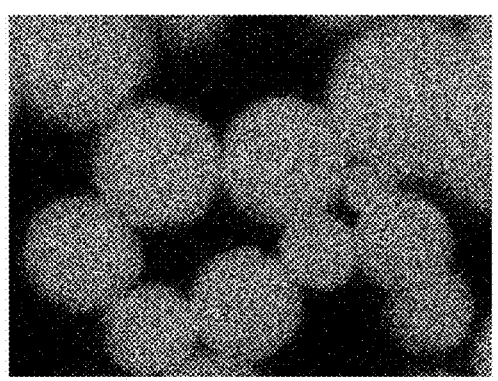
Figure 1C:
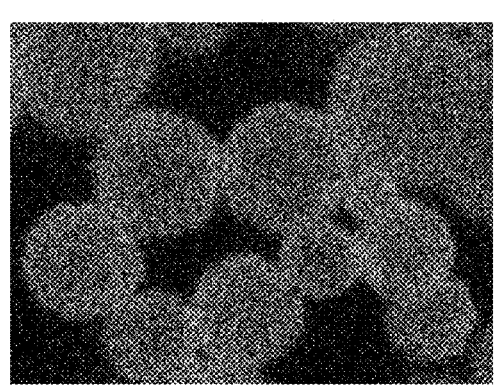
Figure 1D:
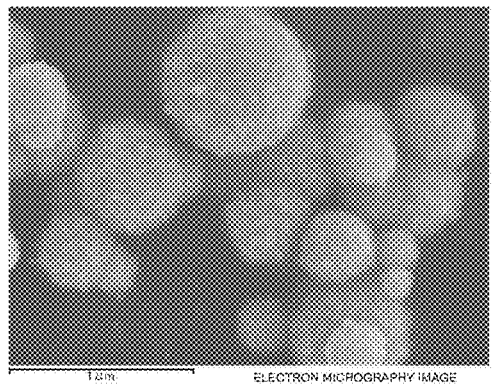
FIG. 1D shows an FE-SEM image and EDX element mapping images of the powder material of Example 3-1, with the upper image being an FE-SEM image, the middle image being an Ag element mapping image and the lower image being a Pd element mapping image.
Figure 1D:
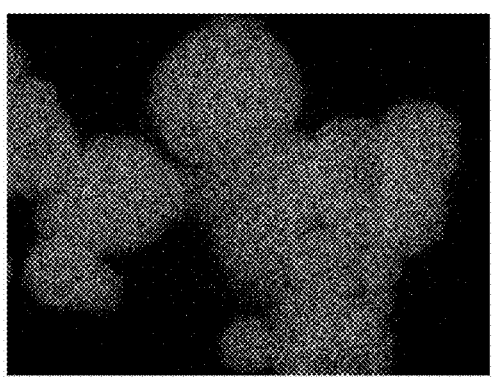
Figure 1D:
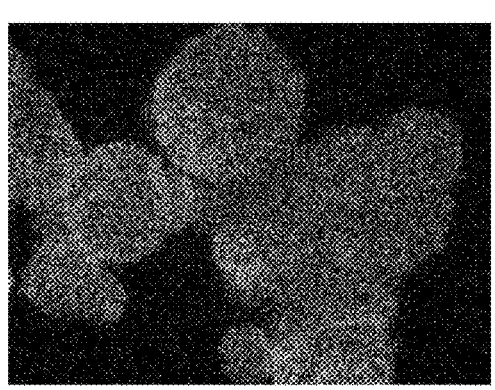
Figure 1E:
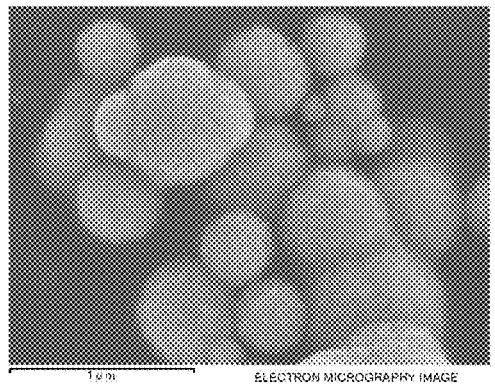
FIG. 1E shows an FE-SEM image and EDX element mapping images of the powder material of Example 3-2, with the upper image being an FE-SEM image, the middle image being an Ag element mapping image and the lower image being a Pd element mapping image.
Figure 1E:
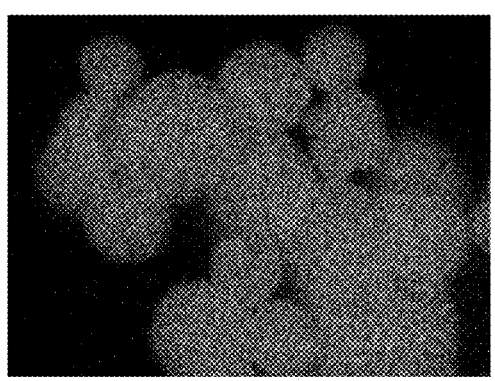
Figure 1E:
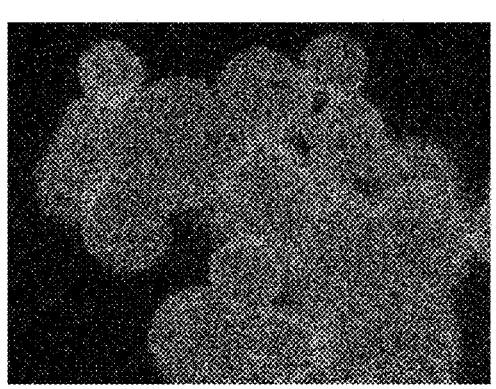
Figure 1F:
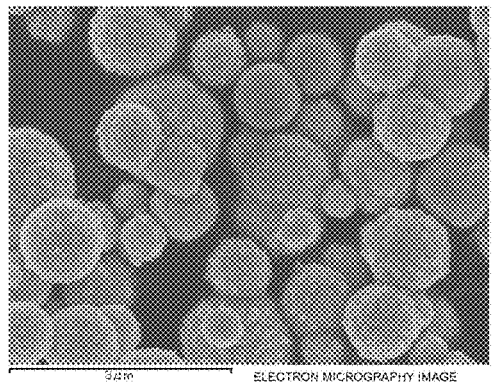
FIG. 1F shows an FE-SEM image and EDX element mapping images of the powder material of Example 4-1, with the upper image being an FE-SEM image, the middle image being an Ag element mapping image and the lower image being a Pd element mapping image.
Figure 1F:
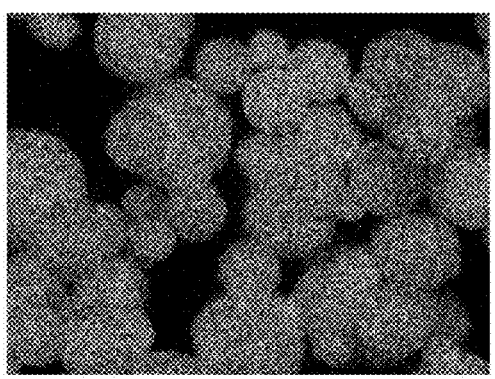
Figure 1F:
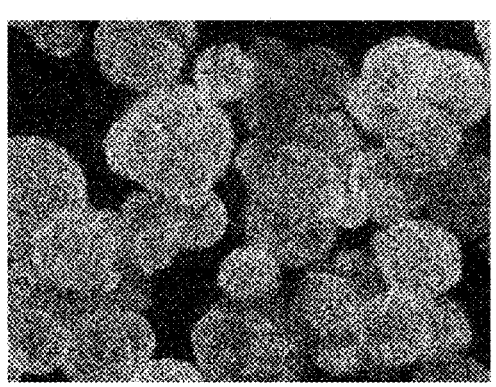
Figure 1G:
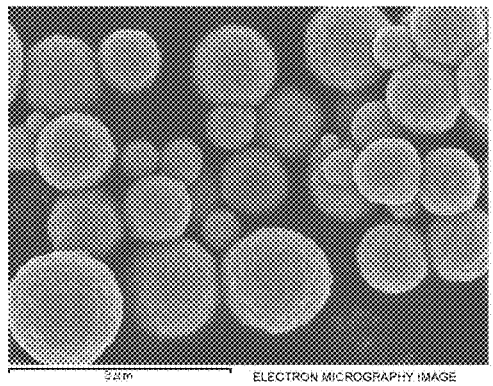
FIG. 1G shows an FE-SEM image and EDX element mapping images of the powder material of Example 5-1, with the upper image being an FE-SEM image, the middle image being an Ag element mapping image and the lower image being a Pd element mapping image.
Figure 1G:
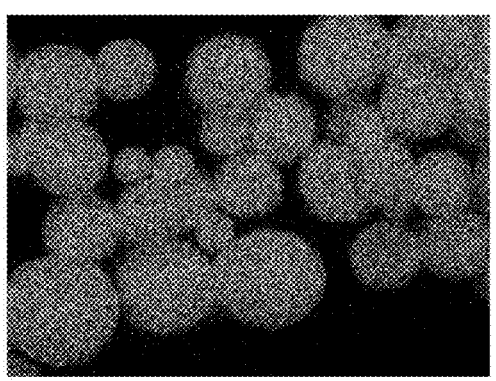
Figure 1G:
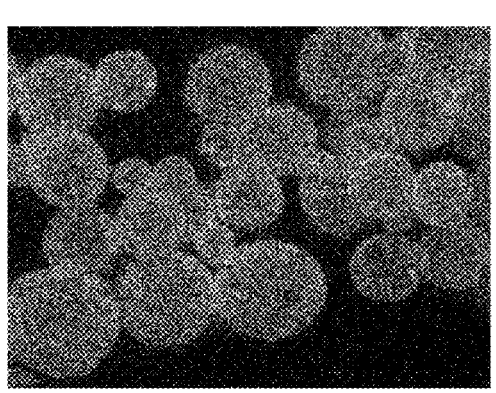
Figure 1H:
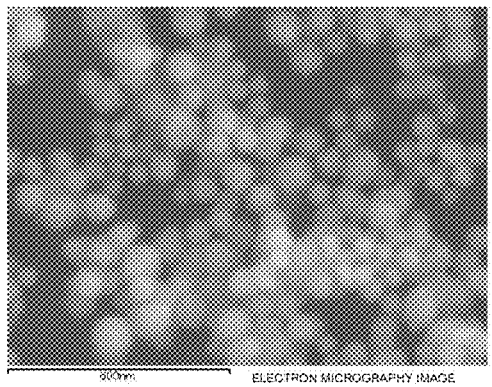
FIG. 1H shows an FE-SEM image and EDX element mapping images of the powder material of Example 6-1, with the upper image being an FE-SEM image, the middle image being an Ag element mapping image and the lower image being a Pd element mapping image.
Figure 1H:
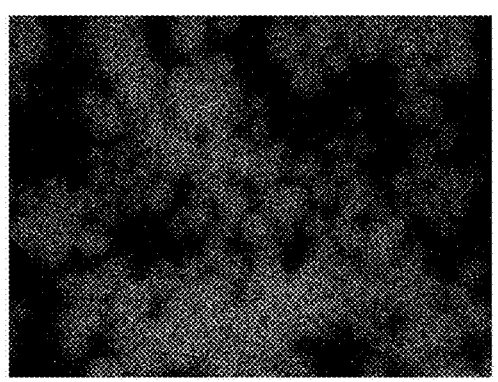
Figure 1H:
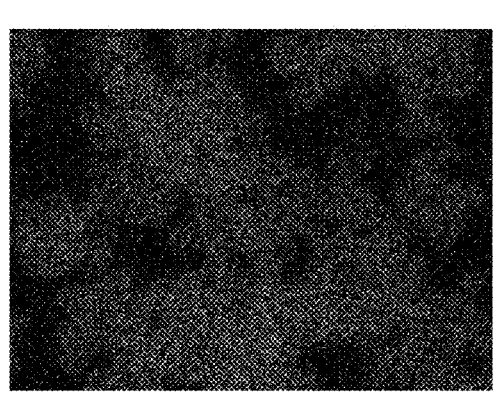

Preferred embodiments of the present invention are explained below. Matters not specifically mentioned in this Description that are necessary for implementing the present invention can be understood as design matters by a person skilled in the art based on prior art in the field. The present invention can be implemented based on the content disclosed in this Description and on technical common knowledge in the field.

Specific numerical ranges represented as "A to B" (in which A and B are any numbers) in the present Description signify at least A but not more than B.

The manufacturing method disclosed here is a method for manufacturing metal fine particles with a core-shell structure that is Ag—Pd core-shell particles in which the core part contains Ag and the shell part contains Pd. Roughly speaking, this manufacturing method encompasses a step of preparing a first reaction solution containing a silver compound for constituting Ag core particles, a step of performing reduction treatment to produce Ag core particles containing the silver contained in the first reaction solution as a principal constituent element, a step of preparing a second reaction solution by adding a palladium compound for constituting a Pd shell to a dispersion solution of the resulting Ag core particles in a dispersed state, and a step of performing reduction treatment to form a Pd shell containing palladium as a principal constituent element on the surface of the Ag core particles in the reaction solution.

In the manufacturing method disclosed here, the materials forming the Ag core particles and Pd shell described above are supplied to the manufacturing process in the form of compounds containing Ag and Pd as constituent elements. The silver compound and palladium compound used here may be any that can produce Ag core particles and Pd shell when subjected to reduction treatment in the respective reaction solutions.

Salts or complexes of silver and palladium can be used favorably as the silver compound and palladium compound. Halides such as chlorides, bromides and iodides and hydroxides, sulfides, sulfate salts, nitrate salts and the like may be used favorably as salts. Amine complexes, cyano complexes, halogeno complexes, hydroxy complexes and the like may be used as complexes.

The first reaction solution used in the manufacturing method disclosed here may be prepared as a solution of such a silver compound dissolved in a suitable solvent or a liquid dispersion of such a silver compound dispersed in a suitable dispersion medium. The solvent (here and above, includes dispersion media) used to constitute the reaction solution may be an aqueous solvent or an organic solvent.

When preparing the first reaction solution with an aqueous solvent, water or a mixed liquid primarily comprising water (such as a mixed solution of water or ethanol) may be used as the solvent. When preparing the first reducing agent with an organic solvent, an alcohol such as methanol or ethanol, a ketone such as acetone or methyl ketone, or an ester such as ethyl acetate or the like may be used.

The content of the silver compound in the reaction solution is not particularly limited because it may differ according to the object. As one example, when the solvent is water or an aqueous solvent (such as a mixed solvent of water and ethanol), the reaction solution is preferably prepared so that the molar concentration of the silver compound is about 0.1 M to 3 M.

Various additives may also be added in addition to the silver compound and solvent when preparing the first reaction solution. Examples of such additives include complexing agents. Ammonia water, potassium cyanide, hydrazine monohydrate or the like may be used as a complexing agent. By adding a suitable amount of this complexing agent, a complex having Ag as the central metal ion can be easily formed in the reaction solution. Ag core particles can thus be easily precipitated by subsequent reduction treatment.

When preparing the first reaction solution, moreover, the solution may also be stirred while maintaining the temperature condition within a certain range. The temperature condition in this case may be about 20° C. to 60° C. (more preferably 30° C. to 50° C.). The stirring rotation speed may be about 100 rpm to 1,000 rpm (more preferably 300 rpm to 800 rpm, such as 500 rpm).

In the manufacturing method disclosed here, Ag core particles are produced by reduction treatment of a first reaction solution containing a silver compound such as those discussed above. This step can be easily performed by adding a suitable reducing agent (first reducing agent) to the reaction solution containing the silver compound.

The first reducing agent is prepared so as to contain at least hydroquinone ($C_6H_6O_2$). As discussed above, by using hydroquinone as a reducing agent it is possible to include hydroquinone and/or a quinone on the surface of the resulting Ag core particles.

The first reducing agent is preferably also prepared so as to contain PVP in addition to hydroquinone. By using a reducing agent containing PVP in addition to hydroquinone, it is possible to efficiently produce Ag core particles in which a composite of PVP with hydroquinone and/or a quinone is present on the surface of the particles. The first reducing agent may also include a reducing agent other than hydroquinone and PVP. For example, it may include a hydrazine compound such as hydrazine carbonate, hydrazine, hydrazine monohydrate, phenylhydrazine or the like.

The added amount of the reducing agent may be any amount sufficient to reduce all of the silver compound contained in the first reaction solution within a specific amount of time, and is not particularly limited because it may be set appropriately according to the condition of the reaction system. During this process, the particles diameter of the Ag core particles (and hence the particle diameter of the Ag—Pd core-shell particles) can be controlled by suitably adjusting the concentration of the reducing agent. In general, the particle diameter of the Ag core particles (and hence the particle diameter of the Ag—Pd core-shell particles) can be reduced by increasing the concentration of the reducing agent. It is also desirable to adjust the pH to at least 8, such as about pH 9 to 11, by adding a pH adjuster to the first reaction solution during reduction treatment. For example a basic substance such as sodium hydroxide (NaOH), ammonia water or the like may be used as the pH adjuster here.

The reduction treatment time may be set appropriately. It is not particularly limited, but may be about 0.5 hours to 3 hours for example.

The Ag core particles produced by the above reduction treatment may be collected by conventional methods, without any particular limitations. Preferably, the Ag core particles produced in the reaction solution is precipitated or centrifuged, and the supernatant removed. Preferably after multiple washings, the collected Ag core particles can be dispersed in a suitable dispersion medium to obtain as a liquid dispersion of the Ag core particles (hereunder also called an "Ag slurry").

In the manufacturing method disclosed here, a palladium compound for the Pd shell is then added as described above to the Ag slurry to prepare a second reaction solution. The content of the palladium compound in this second reaction solution is not particularly limited because it may differ depending on the object. As one example, if the mass ratio Ag/Pd of Ag to Pd in the second reaction solution is about 70/30 to 95/5 (such as 80/20 to 90/10), a good Pd shell can be formed with a high coverage rate while limiting the amount of expensive Pd used.

The solvent (dispersion medium) and other additives and preparation process and the like for preparing the second reaction solution are not repeated here because they are similar to those used for the first reaction solution. However, because the second reaction solution may also be considered a liquid dispersion of the Ag core particles, performing ultrasound treatment in addition to stirring during preparation is desirable from the perspective of homogenizing the reaction solution. For example, ultrasound homogenization may be performed at a frequency of about 15 kHz to 50 kHz with an output of about 100 W to 500 W.

Various compounds capable of having a reducing effect in the reaction system may be used as the second reducing agent for forming the Pd shell. Desirable examples include, but are not limited to, hydrazine compounds such as hydrazine carbonate, hydrazine, hydrazine monohydrate and phenylhydrazine, and other examples include organic acids such as tartaric acid, citric acid and ascorbic acid and salts of these (tartrate salts, citrate salts, ascorbate salts, etc.), and sodium borohydride and the like.

The added amount of the second reducing agent may be any amount sufficient to suitably form a Pd shell within a specific amount of time on the surface of the Ag core particles contained in the second reaction solution, and is not particularly limited since it may be set appropriately according to the condition of the reaction system. After the reducing agent is added the reaction solution is preferably stirred as the reduction reaction progresses.

The reduction treatment time may be set appropriately, and is not particularly limited, but is preferably about 0.25 hours to 2 hours for example.

Next, the resulting Ag—Pd core-shell particles are collected from the second reaction solution. The method of collection may be similar to conventional methods, without any particular limitations. It may be similar to the method used to collect the Ag core particles from the first reaction solution above. For example, the Ag—Pd core-shell particles produced in the reaction solution may be precipitated, or the reaction solution may be centrifuged and the supernatant removed. Preferably after multiple washings, the particles can be dried and crushed appropriately to obtain a powder material substantially comprising the Ag—Pd core-shell particles. This powder material can then be dispersed in a suitable dispersion medium to obtain a paste (slurry) composition.

The Ag—Pd core-shell particles disclosed here can be manufactured suitably by the manufacturing method disclosed here via the above steps. A powder material substantially comprising the Ag—Pd core-shell particles can also be provided.

The Ag—Pd core-shell particles provided here may be any Ag—Pd core-shell particle consisting of Ag core particles containing silver as a principal constituent element and a Pd shell containing palladium as a principal constituent element covering at least part of the surface of the Ag core particles, with hydroquinone and/or a quinone attached to the surface of the core-shell particles, and other components (constituent metal elements, etc.) are not excluded. For example, given 100 mol % as the substance amount of all metal elements contained in the Ag core particles, the substance amount of Ag may be 90 mol % to 100 mol %, or preferably 95 mol % to 100 mol %. Examples of metal elements other than Ag element that may be contained in the Ag core particles in this case include nickel (Ni), copper (Cu), aluminum (Al), palladium (Pd), iron (Fe), cobalt (Co), gold (Au), platinum (Pt), ruthenium (Ru), iridium (Ir), indium (In), zinc (Zn), tin (Sn), bismuth (Bi), antimony (Sb) and the like. Of these, a platinum group elements such as Pd or Pt is suitable from the standpoint of compatibility with the Pd shell and the like. A compound such as an oxide or sulfide may also be contained in the Ag core particles.

The shape of the Ag core particles is not particularly limited but is preferably roughly spherical, and the average particle diameter may suitably be about 10 nm to 2,000 nm for example, or more preferably 50 nm to 1,000 nm.

The average particle diameter may be measured by various methods. Typical examples include the Z average particle diameter ($D_{DLS}$) based on the dynamic light scattering method (e.g., cumulant method) and the average particle diameter ($D_{SEM}$) based on image measurement with a scanning electron microscope (SEM) such as a field emission scanning electron microscope (FE-SEM imaging).

The Pd shell is a metal coating containing Pd as a principal constituent metal element.

Like the Ag core particles discussed above, the Pd shell may contain various metal elements other than Pd. For example, given 100 mol % as the substance amount of all metal elements contained in the Pd shell, the substance amount of the Pd element may be 80 mol % to 100 mol %, or preferably 90 mol % to 100 mol %. Examples of metal elements other than Pd that may be contained in the Pd shell include Ni, Cu, Al, Fe, Co, Au, Pt, Ru, Ir, In, Zn, Sn, Bi, Sb and the like. Considering the chemical and thermal stability of the core-shell particle surface and compatibility with the Ag core particles, moreover, a platinum group metal such as Pt is suitable out of these metal elements for reasons of compatibility with the Pd shell. A small amount of a compound such as an oxide or sulfide may also be contained in the Pd shell. Au, Pt, Ag and the like are preferably included as metal elements other than Pd. For example, such a metal element may be contained in the Pd shell in the form of a compound such as an oxide, phosphide, nitride or the like. The thickness of the Pd shell is not particularly limited in the present invention, but may be 0.2 nm to 100 nm for example.

Because the powder material disclosed here has various advantages such as those listed under (1) to (3) above, it can contribute to reducing the size of electronic parts and producing thinner electrode films when used in the field of electronic materials.

In particular, electrode films can be made even thinner and reliability can be further improved by adopting a powder material consisting of Ag—Pd core-shell particles with a relatively small average particle diameter and a narrowly controlled particle size distribution, such as a powder material in which the Z average particle diameter ($D_{DLS}$) based on the dynamic light scattering method is 0.1 μm to 2 μm and the polydispersity index (PDI) based on the dynamic light scattering method is 0.4 or lower, or preferably a powder material in which the ratio $D_{DLS}/D_{SEM}$ of $D_{DLS}$ to the average particle diameter ($D_{SEM}$) based on a field emission scanning electron microscope imaging (FE-SEM imaging) is 2 or lower.

Paste compositions (conductive pastes) for various applications can also be provided by dispersing the powder material disclosed here in a dispersion medium such as an aqueous solvent or organic solvent. Such a conductive paste can suitably form a sufficiently thin electrode because it comprises Ag—Pd core-shell particles with a particle diameter controlled within the submicron range.

The dispersion medium for the conductive paste may be any capable of properly dispersing a conductive powder material as in prior art, and those used in preparing conventional conductive pastes may be used without any particular limitations. For example, one or more kinds of mineral spirits and other petroleum hydrocarbons (especially aliphatic hydrocarbons); cellulose polymers such as ethyl cellulose; derivatives of ethylene glycol and diethylene glycol; and high boiling point organic solvents such as toluene, xylene, butyl carbitol (BC), turpineol and the like may be used as organic solvents.

In addition to the Ag—Pd core-shell particles, the conductive paste may also contain additives such as dispersants, resin materials (for example, acrylic resins, epoxy resins, phenol resins, alkyd resins, cellulose polymers, polyvinyl alcohol, rosin resin, etc.), vehicles, fillers, glass frit, surfactants, antifoaming agents, plasticizers (for example, phthalate esters such as dioctyl phthalate (DOP)), thickeners, anti-oxidants, dispersants, polymerization inhibitors and the like.

Some examples of the manufacture and use of the Ag—Pd core-shell particles disclosed here are explained below, but these test examples are not intended to restrict the present invention. In the Ag—Pd core-shell particle manufacturing examples below, the Ag/Pd mass ratio of the raw material paste is 90/10 in all cases.

1. Manufacturing Example of Ag Slurry

Sample A (Hereunder Called "Ag Slurry A")

15.63 g of silver nitrate ($AgNO_3$: Ohura Precious Metal Industry Co., Ltd.) were dissolved in 150 mL of pure water, 13 mL of 28% ammonia water (Wako Pure Chemical Industries, Ltd.) were added, and the mixture was stirred with a magnetic stirrer to prepare a first solution A containing an Ag amine complex (silver compound) as a raw material.

Next, 5.07 g of hydroquinone (Tokyo Chemical Industry Co., Ltd.) and 3.00 g of polyvinylpyrrolidone (PVP) K30 (Wako Pure Chemical Industries, Ltd.) were dissolved in 150 mL of alcohol (industrial alcohol, Amakasu Chemical Industries), and 0.18 mL of hydrazine monohydrate (Wako Pure Chemical Industries, Ltd.) were added and stirred to prepare a first reducing agent.

The first solution A was then stirred with a magnetic stirrer (500 rpm) as the first reducing agent was added all at once, to produce Ag core particles by the reducing effect of the reducing agent. This was then precipitated for about 1 hour and the supernatant removed, after which 300 mL of the same alcohol were added and stirred, and the particles was precipitated again for about 1 hour and the supernatant removed.

A washing step of adding 40 mL of the alcohol, centrifuging the resulting slurry of the dispersed Ag core particles in a commercial centrifuge for 5 minutes at 6,000 rpm, precipitating, and removing the supernatant was then performed twice.

The same step was then repeated with the 40 mL of alcohol replaced with 40 mL of a mixed solvent of alcohol and pure water (volume ratio 1:1).

Pure water was then added to the resulting Ag core particles precipitate to prepare an Ag slurry A.

The results of the thermogravimetric/differential thermal analysis (TG-DTA) described below confirmed that the Ag core particles constituted about 33.34 wt % of the total of the Ag slurry A, which also contained small quantities of PVP and quinones derived from hydroquinone.

Sample B (Hereunder Called "Ag Slurry B")

An Ag slurry B was prepared with the same materials and by the same process as the Ag slurry A except that the added amount of the hydrazine monohydrate was changed to 0.018 mL.

The TG-DTA results confirmed that the Ag core particles constituted about 36.73 wt % of the total of the Ag slurry B, which also contained small quantities of PVP and quinones derived from hydroquinone.

Sample C (Hereunder Called "Ag Slurry C")

An Ag slurry C was prepared with the same materials and by the same process as the Ag slurry A except that no PVP was added.

The TG-DTA results confirmed that the Ag core particles constituted about 30.34 wt % of the total of the Ag slurry C, which also contained small quantities of quinones derived from hydroquinone.

Sample D (Hereunder Called "Ag Slurry D")

An Ag slurry D was prepared with the same materials and by the same process as the Ag slurry A except that neither hydrazine monohydrate nor PVP was added.

The TG-DTA results confirmed that the Ag core particles constituted about 30.43 wt % of the total of the Ag slurry D, which also contained small quantities of quinones derived from hydroquinone.

Sample E (Hereunder Called "Ag Slurry E")

An Ag slurry E was prepared with the same materials and by the same process as the Ag slurry A except that no hydrazine monohydrate was added.

The TG-DTA results confirmed that the Ag core particles constituted about 26.55 wt % of the total of the Ag slurry E, which also contained small quantities of PVP and quinones derived from hydroquinone.

Sample F (Hereunder Called "Ag Slurry F")

An Ag slurry F was prepared with the same materials and by the same process as the Ag slurry A except that the amount of the 28% ammonia water used was changed to 26 mL.

The TG-DTA results confirmed that the Ag core particles constituted about 20.57 wt % of the total of the Ag slurry F, which also contained small quantities of PVP and quinones derived from hydroquinone.

2. Manufacturing Examples of Powder Materials (Examples and Comparative Examples)

Example 1-1

50 mL of a Pd complex solution (prepared to Pd content 0.333 g) prepared by dissolving diammine dichloropalladium (II) in 0.17% ammonia water was added to 9 g of the Ag slurry A (Ag core particle content 3.00 g), and stirred with a magnetic stirrer, after which 44 mL of pure water was added and the mixture was ultrasound dispersed for 10 minutes.

This slurry was then stirred with a magnetic stirrer as 0.85 mL of hydrazine carbonate (Otsuka Chemical Co., Ltd.) was added as a second reducing agent, and stirring was continued for about 30 minutes. About 70 to 80 seconds after addition of the hydrazine carbonate, bubbling and blackening of the slurry indicating Pd precipitation due to reduction of the Pd complex were observed. XRF analysis of the supernatant subsequently confirmed that all of the Pd complex used had been reduced and precipitated.

The resulting Ag—Pd core-shell particle slurry (hereunder called the "Ag—Pd slurry") was then precipitated for about 1 hour (almost completely precipitated within 1 hour), and the supernatant was removed, after which a washing step of dispersing in 40 mL of a mixed solvent of the alcohol and pure water (volume ratio 1:1), centrifuging for 10 minutes at 6,000 rpm with a commercial centrifuge and removing the supernatant was performed twice. A similar washing step was then performed with 40 mL of pure water instead of 40 mL of the mixed solvent of alcohol and pure water (volume ratio 1:1).

A step of adding 40 mL of acetone to replace the water contained in the resulting Ag—Pd core-shell particles (powder) with acetone, dispersing and centrifuging (6,000 rpm, 10 minutes), and removing the supernatant was then performed twice. This was then vacuum dried for about 1 hour at room temperature, and crushed in a mortar to prepare a dried powder material consisting of Ag—Pd core-shell particles of Example 1-1.

Example 1-2

A dried powder material consisting of Ag—Pd core-shell particles of Example 1-2 was prepared using the same materials and by the same process as the powder material of Example 1-1 except that 0.20 g of polyvinylpyrrolidone (PVP) K30 (Wako Pure Chemical Industries, Ltd.) was also dissolved (added) in the Pd complex solution.

Example 2-1

A dried powder material consisting of Ag—Pd core-shell particles of Example 2-1 was prepared using the same materials and by the same process as the powder material of Example 1-1 except that the 9 g of the Ag slurry A (Ag core particle content 3.00 g) was replaced with 8.17 g of the Ag slurry B (Ag core particle content 3.00 g).

Example 3-1

A dried powder material consisting of Ag—Pd core-shell particles of Example 3-1 was prepared using the same materials and by the same process as the powder material of Example 1-1 except that the 9 g of the Ag slurry A (Ag core particle content 3.00 g) were replaced with 9.89 g of the Ag slurry C (Ag core particle content 3.00 g).

Example 3-2

A dried powder material consisting of Ag—Pd core-shell particles of Example 3-2 was prepared using the same materials and by the same process as the powder material of Example 1-2 except that the 9 g of the Ag slurry A (Ag core particle content 3.00 g) were replaced with 9.89 g of the Ag slurry C (Ag core particle content 3.00 g), and the PVP was replaced to polyvinylpyrrolidone (PVP) K90 (Wako Pure Chemical Industries, Ltd.).

Example 4-1

A dried powder material consisting of Ag—Pd core-shell particles of Example 4-1 was prepared using the same materials and by the same process as the powder material of Example 1-1 except that the 9 g of the Ag slurry A (Ag core particle content 3.00 g) was replaced with 9.86 g of the Ag slurry D (Ag core particle content 3.00 g).

Example 5-1

A dried powder material consisting of Ag—Pd core-shell particles of Example 5-1 was prepared using the same materials and by the same process as the powder material of Example 1-1 except that the 9 g of the Ag slurry A (Ag core particle content 3.00 g) was replaced with 11.30 g of the Ag slurry E (Ag core particle content 3.00 g).

Example 6-1

A dried powder material consisting of Ag—Pd core-shell particles of Example 6-1 was prepared using the same materials and by the same process as the powder material of Example 1-2 except that the 9 g of the Ag slurry A (Ag core particle content 3.00 g) was replaced with 14.58 g of the Ag slurry F (Ag core particle content 3.00 g).

Comparative Example 1

0.655 g of the above diammine dichloropalladium (II) were dissolved in 100 mL of 0.17% ammonia water to prepare a Pd complex solution, and 0.30 g of polyethylene glycol #200 (Kanto Chemical Co., Inc.) were further added and dissolved.

3.0 g of commercial Ag powder (Mitsui Mining & Smelting Co., Ltd. SPQ02X) were added to this Pd complex solution, which was stirred with a magnetic stirrer and then ultrasound treated for 10 minutes. This was stirred with a magnetic stirrer as 0.85 mL of hydrazine carbonate (Otsuka Chemical Co., Ltd.) was added as a reducing agent, and the stirring was continued for 30 minutes. In this process, all of the Pd was reduced by the hydrazine carbonate and precipitated.

A powder material of Comparative Example 1 was then prepared with the same materials and by the same process as in Example 1-1.

Comparative Example 2

A powder material of Comparative Example 2 was prepared using the same materials and by the same process as in Comparative Example 1 except that 0.15 g of ANTI-TERRA 250 (BYK) was added to the Pd complex solution and dissolved as a dispersant, and no polyethylene glycol #200 was added.

Comparative Example 3

A powder material of Comparative Example 3 was prepared using the same materials and by the same process as in Comparative Example 2 except that the added amount of the ANTI-TERRA 250 (BYK) was increased to 2.00 g.

Comparative Example 4

A powder material of Comparative Example 4 was prepared using the same materials and by the same process as in Comparative Example 2 except that the dispersant was changed from ANTI-TERRA 250 to BYK-LP C 22136 (BYK), and 0.15 g was added.

Comparative Example 5

A powder material of Comparative Example 5 was prepared using the same materials and by the same process as in Comparative Example 4 except that the dispersant was changed from BYK-LP C 22136 to BYK-LP C 22139 (BYK).

Comparative Example 6

A powder material of Comparative Example 6 was prepared using the same materials and by the same process as in Comparative Example 4 except that the dispersant was changed from BYK-LP C 22136 to BYK-LP C 22141 (BYK).

Comparative Example 7

A powder material of Comparative Example 7 was prepared using the same materials and by the same process as in Comparative Example 4 except that the dispersant was changed from BYK-LP C 22136 to DISPERBYK 102 (BYK).

Comparative Example 8

A powder material of Comparative Example 8 was prepared using the same materials and by the same process as in Comparative Example 1 except that no polyethylene glycol #200 was added, and the added Ag powder was changed from commercial Ag powder (SPQ02X) to a known PVP-attached Ag powder G (which can be prepared for example by the manufacturing methods disclosed in Example 6 of Japanese Patent Application Publication No. H04-59904).

3. Evaluation Tests

Each of these powder materials was subjected to the various evaluation tests described below.

(1) FE-SEM Observation and EDX Analysis of Pd Dispersion State

Using commercial S-4700 (Hitachi High-Technologies Corporation) and X-max (Horiba, Ltd.) units, the average particle diameter ($D_{SEM}$) and Pd distribution state were investigated based on FE-SEM of the Ag—Pd core-shell particles.

That is, the particle diameters of at least 200 particles were measured from FE-SEM images of multiple visual fields for each sample, and the average particle diameter ($D_{SEM}$) and standard deviation were calculated based on the FE-SEM images. Obviously linked (necked) particles were counted as one particle. Thus, the degree of obvious particle linking (necking) due to shell formation can be assessed by comparing the average particle diameters ($D_{SEM}$) of the Ag core particles and Ag—Pd core-shell particles based on the FE-SEM images.

The test results for each example are shown in FIGS. 1A to 1H. The average particle diameters (nm) and standard deviations of the powder materials of each example and the Ag slurries A to F based on FE-SEM are also shown in the corresponding columns of Table 1.

In FIGS. 1A to 1H, Pd was deposited roughly uniformly on all of the Ag particles, and no individual Pd particles or Ag particles without deposited Pd were confirmed in any of the visual fields.

This shows that because hydroquinone and/or a quinone is attached to the surface of the produced Ag core particles, reduction precipitation of Pd ions in the subsequent Pd shell formation step can occur selectively (by preference) on the surface of the Ag core particles. Consequently, with the manufacturing method disclosed here Ag—Pd core-shell particles can be manufactured with high yield. Furthermore, because reduction precipitation of Pd ions occurs selectively (by preference) on the surface of the Ag core particles, Pd precipitation at points of contacts between Ag core particles is suppressed during the Pd shell formation process. This means that agglomeration and necking are suppressed during Pd shell formation, resulting in Ag—Pd core-shell particles with a small particle diameter or a narrowly controlled particle size distribution.

In Examples 3-1 and 4-1 manufactured using no PVP, the Pd was deposited in particle form on the surface of the Ag core particles. In the other examples manufactured using PVP together with hydroquinone, on the other hand, the Pd was deposited as a film with a high coverage rate on the surface of the Ag core particles. This shows that when PVP was included together with hydroquinone during manufacture, a complex of PVP and hydroquinone and/or a quinone existed stably on the surface of the resulting Ag core particles, with the result that reduction deposition of Pd ions subsequently progressed more selectively (by preference) on the surface of the Ag core particles, and Ag—Pd core-shell particles could be efficiently manufactured having a Pd shell formed are a film with a high coverage rate.

Figure 2A:
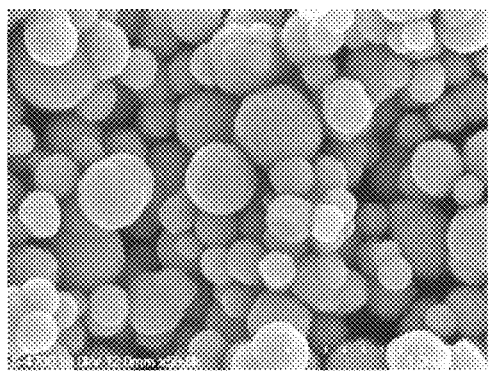
FIG. 2A is an FE-SEM image of a commercial Ag powder used in the comparative examples.
Figure 2B:
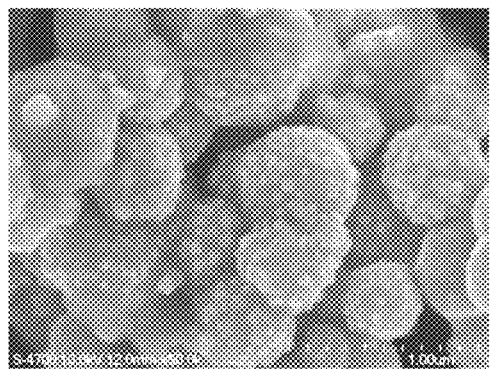
FIG. 2B is an FE-SEM image of the powder material of Comparative Example 3.

Meanwhile, FIG. 2A shows an FE-SEM image of a commercial Ag powder used to manufacture the powder materials of Comparative Examples 1 to 7, and FIG. 2B shows an FE-SEM image of the powder material of Comparative Example 3.

As shown by these SEM images, in the powder materials of the comparative example using no hydroquinone or PVP there was conspicuous agglomeration and linking (necking) of particles, and only Ag—Pd core-shell particles with poor dispersibility were obtained. Although detailed results are not shown, Pd shell formation was also poor, and the shell only formed patchily on part of the Ag core particles.

Regarding the other comparative examples, no FE-SEM image was taken of the powder material of Comparative Example 1 because there was severe agglomeration. In the powder materials of Comparative Examples 2, 4 and 5 to 7, Pd was deposited on the inner surface of the reaction vessel, and almost none of the target Ag—Pd core-shell particles were formed.

Figure 2C:
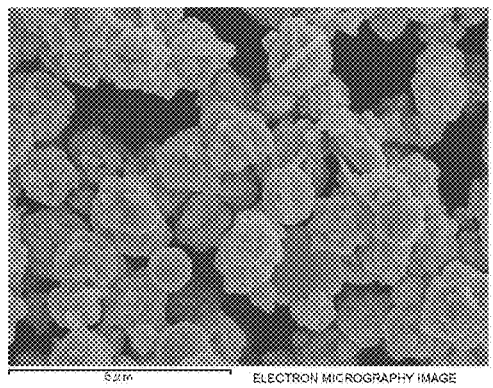
FIG. 2C shows an FE-SEM image and EDX element mapping images of the powder material of Comparative Example 8, with the upper image being an FE-SEM image, the middle image being an Ag element mapping image and the lower image being a Pd element mapping image.
Figure 2C:
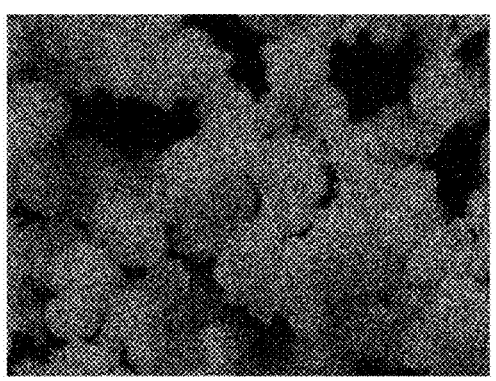
Figure 2C:
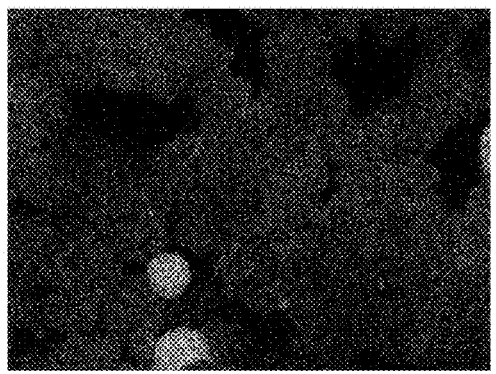

Although the known Ag powder G with attached PVP used in Comparative Example 8 was obtained by hydroquinone reduction of silver nitrate as in the present invention, the hydroquinone and/or quinone was converted into other substances by addition of sulfite salts, with the result that no hydroquinone or quinone was present in the Ag particles or its slurry. That is, the Ag particles had only attached PVP, and the absence of hydroquinone and/or quinone was confirmed from the thermal desorption GC-MS measurement results shown in FIG. 4. The FE-SEM image of the powder material of Comparative Example 8 shown in FIG. 2C confirms poor Pd shell formation and formation of independent Pd particles. This shows that even an Ag powder prepared by hydroquinone reduction does not yield high-quality Ag—Pd core-shell particles unless hydroquinone and/or a quinone present.

(2) Calculating Organic Material Content by TG-DTA

Using a commercial Thermo plus TG8120 unit (Rigaku Corporation) unit, the temperature was raised from room temperature to 600° C. at a rate of 20° C./minute, and maintained for 10 minutes.

The weight reduction up to 160° C. is mainly attributable to evaporation of adsorbed water and solvent, so "the organic content (wt %)" was calculated from the weight reduction accompanying the endothermic peak from organic matter combustion relative to the remaining weight after this initial weight reduction. Organic matter here substantially means hydroquinone and/or quinones (Examples 3-1, 4-1) or hydroquinone and/or quinones and PVP (other examples). The results are shown in the corresponding column of Table 1.

(3) Calculating BET Specific Surface Area

Using a commercial BELSORP-max unit (MicrotracBEL Corp.), pre-treatment was performed for at least 1 hour in vacuum (room temperature), the −196° C. $N_2$ adsorption isotherm was measured, and the specific surface area was determined by the BET multipoint method. The BET diameter was also calculated by the following formula from the specific surface area:

$$d = 6/(\rho s)$$

where d is the BET diameter, ρ is the density (Ag: 10.49 g/cm³, AgPd (Pd=10 wt %): 10.64 g/cm³), and s is the BET specific surface area.

The results are shown in the corresponding column of Table 1.

(4) Calculating Z Average Particle Diameter ($D_{DLS}$), Polydispersity Index (PDI) and Particle Size Distribution Based on Dynamic Light Scattering (DLS) Method Using a commercial Zetasizer Nano ZS (Malvern Panalytical), samples were prepared to suitable concentrations by ultrasound dispersion using specific media (water, N,N-dimethylformamide (DMF) or ethylene glycol (EG)) as dispersion media, and subjected to DLS measurement at 20° C. to 25° C., and the Z average particle diameter ($D_{DLS}$) and polydispersity index (PDI) were determined based on the general cumulant method. Suitable dispersion media and dispersion methods may be selected according to the sample type, and additives such as dispersants and viscosity adjusters may also be used.

Moreover, based on the general NNLS method, we also investigated at least what percentage of the total peak intensity was occupied by peak intensity in the peak particle diameter range of 0.1 μm to 2 μm in the particle size distribution on the basis of scattered intensity.

We also investigated the $D_{DLS}/D_{SEM}$ ratio of the Z average particle diameter ($D_{DLS}$) to the average particle diameter ($D_{SEM}$) based on FE-SEM imaging. This ratio can be used to evaluate the degree of agglomeration due to shell formation.

The results are shown in the corresponding column in Table 1, and the particle size distributions in each example are shown in FIGS. 3A to 3H in order from Example 1-1 to Example 6-1.

Figure 3A:
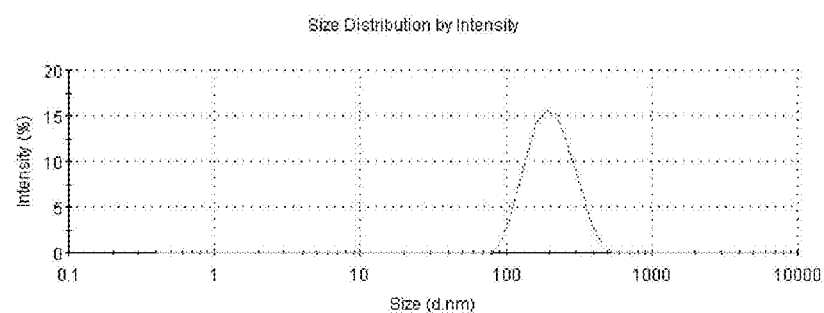
FIG. 3A shows a particle size distribution of the powder material of Example 1-1 according to dynamic light scattering.
Figure 3B:
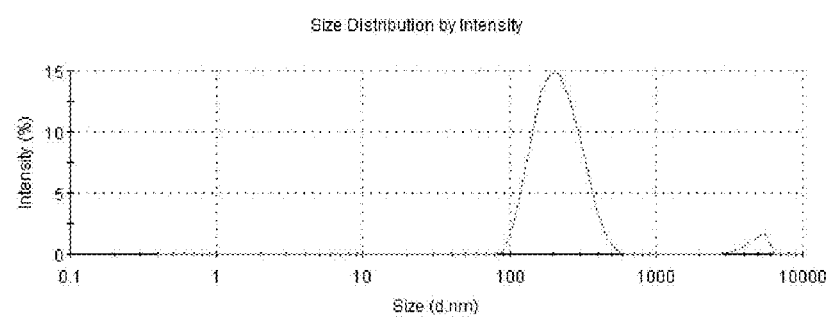
FIG. 3B shows a particle size distribution of the powder material of Example 1-2 according to dynamic light scattering.
Figure 3C:
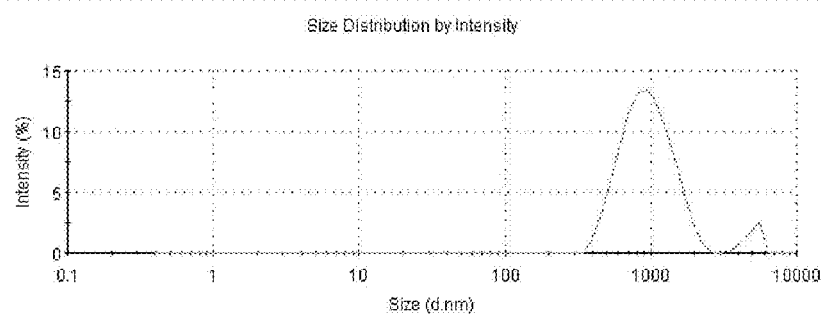
FIG. 3C shows a particle size distribution of the powder material of Example 2-1 according to dynamic light scattering.
Figure 3D:
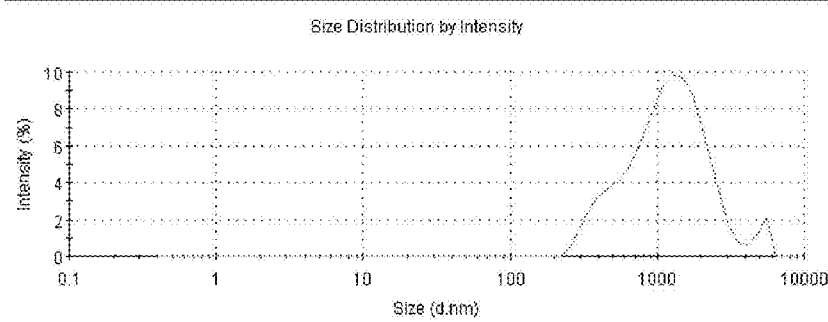
FIG. 3D shows a particle size distribution of the powder material of Example 3-1 according to dynamic light scattering.
Figure 3E:
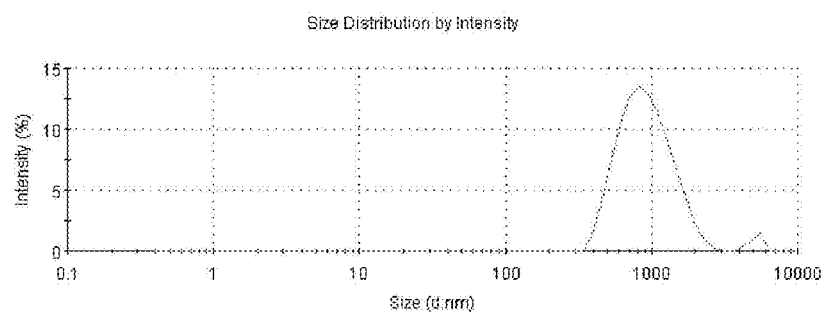
FIG. 3E shows a particle size distribution of the powder material of Example 3-2 according to dynamic light scattering.
Figure 3F:
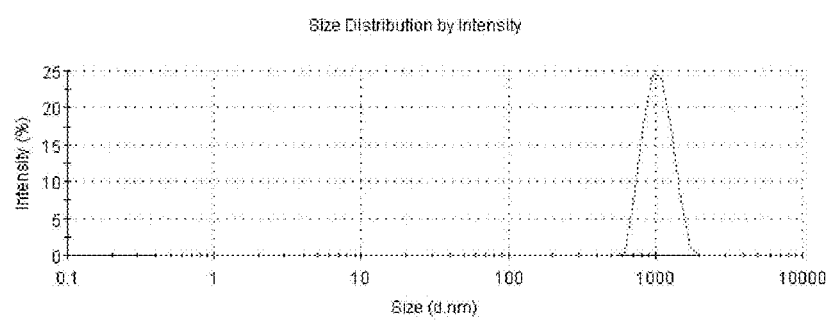
FIG. 3F shows a particle size distribution of the powder material of Example 4-1 according to dynamic light scattering.
Figure 3G:
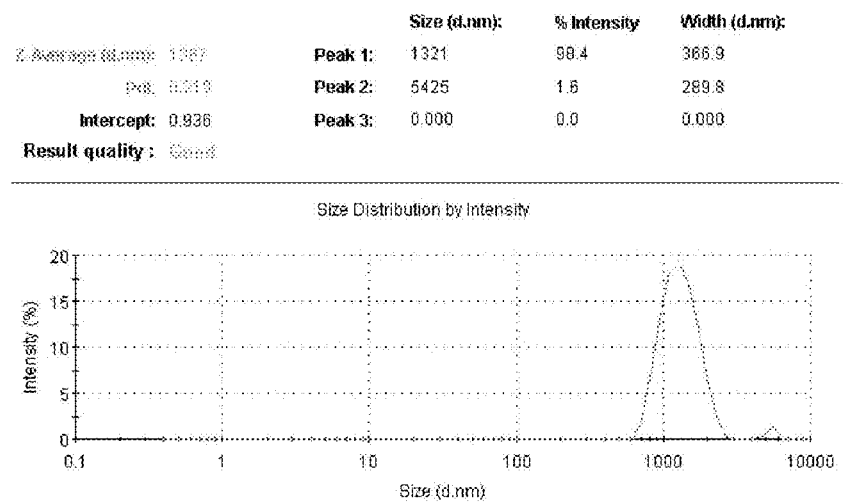
FIG. 3G shows a particle size distribution of the powder material of Example 5-1 according to dynamic light scattering.
Figure 3H:
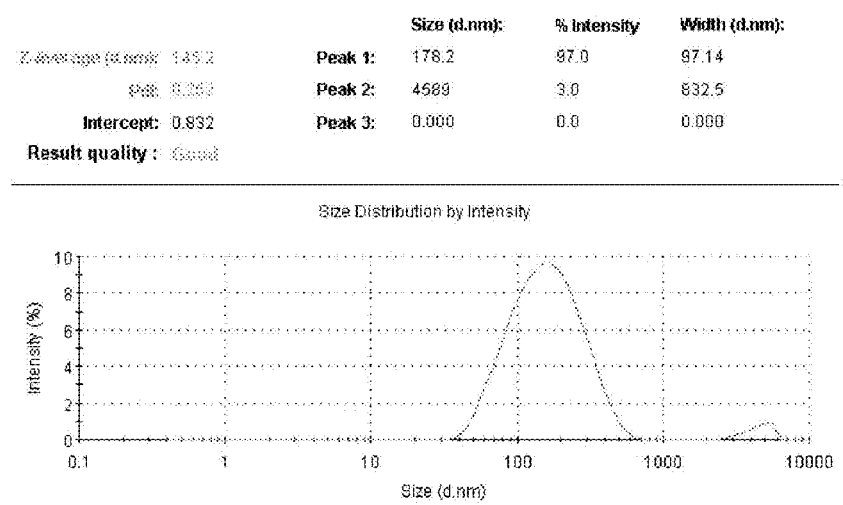
FIG. 3H shows a particle size distribution of the powder material of Example 6-1 according to dynamic light scattering.

The dispersion medium was water when measuring the particle size distributions shown in FIGS. 3A, 3B, 3C and 3H, DMF when measuring the particle size distributions shown in FIGS. 3D, 3E and 3G, and EG when measuring the particle size distribution shown in FIG. 3F.

TABLE 1

| | Sample | PVP addition during Ag synthesis | PVP addition during Pd shell formation | TG-DTA Organic matter content [wt %] | Observed results | | FE-SEM, EDX SEM average diameter [nm] | Standard deviation [nm] | BET Specific surface area [m²/g] | BET diameter [nm] | DLS (cumulant method) Dispersion medium | Z-Average [nm] | PDI | Z/SEM average diameter [—] |
|---|---|---|---|---|---|---|---|---|---|---|---|---|---|---|
| Raw Ag powder 1 | SPQ0 2X | No | — | — | — | — | — | — | 1.88 | 304 | Water | 410.2 | 0.130 | — |
| Ag slurry A | Ag09 27-1 | Yes (K30) | — | — | — | — | 161 | 47 | 4.31 | 133 | Water | 172.3 | 0.116 | 1.07 |
| Example 1-1 | AP10 11-11 | ↑ | No | 1.40 | Core-shell | Pd film deposited | 166 | 64 | 3.82 | 148 | Water | 194.0 | 0.158 | 1.17 |
| Example 1-2 | AP10 11-12 | ↑ | Yes (K30) | 1.50 | Core-shell | Pd film deposited | 168 | 62 | 3.55 | 159 | Water | 216.8 | 0.223 | 1.29 |
| Ag slurry B | Ag09 25-1 | Yes (K30) | — | — | — | — | 447 | 192 | 1.42 | 403 | Water | 691.3 | 0.199 | 1.55 |
| Example 2-1 | AP10 11-21 | ↑ | No | 1.35 | Core shell | Pd film deposited | 574 | 204 | 1.28 | 441 | Water | 973.3 | 0.241 | 1.70 |
| Ag slurry C | Ag11 02 | No | — | — | — | — | 423 | 188 | 1.84 | 311 | DMF | 708.4 | 0.229 | 1.67 |
| Example 3-1 | AP11 06-1 | ↑ | No | 1.42 | Core-shell | Pd particle deposited | 628 | 294 | 2.28 | 247 | DMF | 1080 | 0.352 | 1.72 |
| Example 3-2 | AP11 06-2 | ↑ | Yes (K90) | 1.74 | Core-shell | Pd film deposited | 524 | 274 | 1.60 | 352 | DMF | 900 | 0.194 | 1.72 |

TABLE 1-continued

| | Sample | PVP addition during Ag synthesis | PVP addition during Pd shell formation | TG-DTA Organic matter content [wt %] | Observed results | | SEM average diameter [nm] | Standard deviation [nm] | BET Specific surface area [m²/g] | BET diameter [nm] | DLS (cumulant method) Dispersion medium | Z-Average [nm] | PDI | Z/SEM average diameter [—] |
|---|---|---|---|---|---|---|---|---|---|---|---|---|---|---|
| Ag slurry D | Ag11 13-1 | No | — | — | — | — | 795 | 331 | 1.26 | 454 | Water | 1023 | 0.221 | 1.29 |
| | | | | | | | | | | | DMF | 1113 | 0.224 | 1.40 |
| | | | | | | | | | | | EG | 748.8 | 0.146 | 0.94 |
| Example 4-1 | AP11 14-1 | ↑ | No | 0.96 | Core-shell | Pd particle deposited | 924 | 435 | 1.83 | 308 | Water | 1117 | 0.309 | 1.21 |
| | | | | | | | | | | | DMF | 1155 | 0.223 | 1.25 |
| | | | | | | | | | | | EG | 1035 | 0.120 | 1.12 |
| Ag slurry E | Ag11 13-2 | Yes (K30) | — | — | — | — | 849 | 296 | 1.17 | 489 | Water | 1063 | 0.164 | 1.25 |
| | | | | | | | | | | | DMF | 1037 | 0.177 | 1.22 |
| Example 5-1 | AP11 14-2 | ↑ | No | 1.33 | Core-shell | Pd film deposited | 916 | 336 | 0.982 | 574 | Water | 1622 | 0.368 | 1.77 |
| | | | | | | | | | | | DMF | 1367 | 0.219 | 1.49 |
| Ag slurry F | Ag12 06-2 | Yes (K30) | — | — | — | — | 79 | 29 | 8.87 | 64.5 | Water | 112.7 | 0.201 | 1.43 |
| Example 6-1 | AP12 07-2 | ↑ | Yes | 1.41 | Core-shell | Pd film deposited | 81 | 34 | 6.93 | 81.4 | Water | 145.2 | 0.252 | 1.79 |

As shown from FIGS. 3A to 3H, the peak intensity in the peak particle size range of 0.1 μm to 2 μm in a particle size distribution based on an NNLS algorithm using the dynamic light scattering method was at least 80% of the total based on scattered intensity for all examples. The PDI was also not more than 0.4 (most preferably not more than 0.3) in all cases.

Moreover, as shown in the corresponding column of Table 1, with the manufacturing method disclosed here it is possible to provide a powder material consisting of Ag—Pd core-shell particles with a narrow particle size distribution or in other words with a uniform particle diameter. The $D_{DLS}/D_{SEM}$ values were also not more than 2 or most preferably not more than 1.5 in all cases (such as 1.3 or less in some cases), indicating that agglomeration and linking (necking) had been suppressed. Consequently, the manufacturing method disclosed here can provide a powder material consisting of Ag—Pd core-shell with a relatively small particle diameter and a narrowly controlled particle size distribution because agglomerations and linked clumps with large particle diameters are unlikely to form.

(5) Thermal Desorption GC-MS Measurement

Ag core powders and Ag—Pd core-shell particles were analyzed with a commercial GC-MS unit capable of thermal desorption measurement.

Highly pure helium gas was passed through samples of dried powder as the samples were heated for 30 minutes at 300° C. The gas components emitted by the samples were cooled and concentrated, and subjected to GC-MS measurement. The electron impact method (EI method: 70 eV) was used as the mass spectrometer ionization method.

Figure 4:
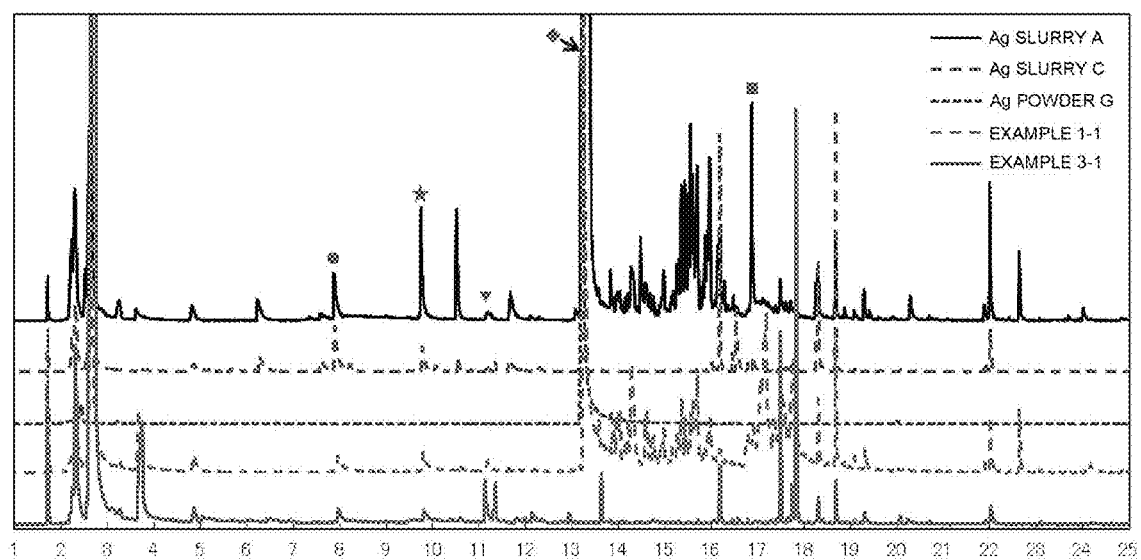
FIG. 4 shows the thermal desorption GC spectra of Ag slurries A and C, Ag powder G and Examples 1-1 and 3-1.

Looking at the measurement results, in the spectra of FIG. 4 the peak near a retention time of 9.7 minutes (star) represents benzoquinone, and the peak near 16.9 minutes (square) represents hydroquinone. The peak near 8.0 minutes (circle) represents maleic anhydride, which is thought to be a decomposition product of hydroquinone or a quinone. In addition, the phenol of the peak at 11.1 minutes (triangle) is thought to be derived from hydroquinone or a quinone. In Ag slurry A, Ag powder G and Example 1-1, the 2-pyrrolidone peak at 13.3 minutes (diamond) is thought derive from PVP. No peak derived from hydroquinone and/or quinones was confirmed from the Ag powder G used in Comparative Example 8.

This confirms that hydroquinone and/or a quinone is present on the surface of the Ag powder and Ag—Pd core-shell particles.

(6) FT-IR Measurement

The FT-IR spectra were analyzed using a commercial Cary 670-IR Fourier transform infrared spectrophotometer (Agilent Technology).

Samples of dried powder were placed in ceramic cups, set in measurement cells, and measured by the diffuse reflection method. Next, an aluminum mirror was measured in the same way as a reference. The resulting spectra were subjected to Kubelka-Munk conversion to produce the spectra shown in FIG. 5. Samples of slurry A, Example 1-1, slurry C and Example 3-1 were measured.

Figure 5:
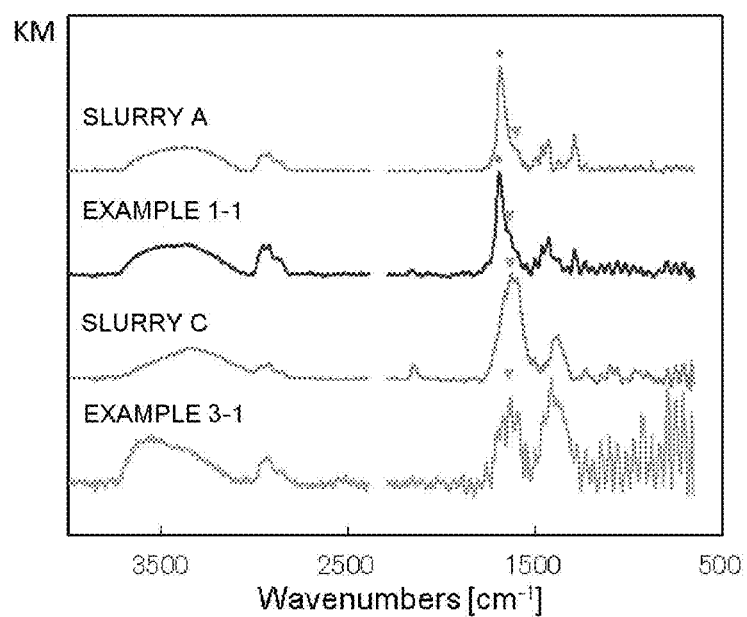
FIG. 5 shows the FT-IR spectra of Ag slurries A and C and Examples 1-1 and 3-1.

The measurement results show a peak derived from PVP (circle) near 1690 cm$^{-1}$ in the spectra in FIG. 5. The peak near 1630 cm$^{-1}$ (triangle) derives from a carboxylic acid salt, which is believed to be a quinone decomposition component.

Thus, this measurement also confirms that a quinones are present on the surface of the Ag core particles and Ag—Pd core-shell particles.

The present invention was explained in detail above based on specific test examples, but these are only examples and do not limit the scope of the claims. The technology described in the claims encompasses various modifications and changes to the specific examples given above.

The invention claimed is:

1. A powder material comprising Ag—Pd core-shell particles consisting of Ag core particles containing silver as a principal constituent element and a Pd shell containing palladium as a principal constituent element covering at least part of the surface of the Ag core particles, wherein at least one of hydroquinone and a quinone is attached to the surface of the Ag—Pd core-shell particles.

2. The powder material according to claim 1, wherein with the powder material dispersed in a medium, the powder material has a Z average particle diameter ($D_{DLS}$) based on the dynamic light scattering (DLS) method of 0.1 μm to 2 μm, and a polydispersity index (PDI) based on the dynamic light scattering method of 0.4 or lower.

3. The powder material according to claim 2, wherein the powder material has a ratio $D_{DLS}/D_{SEM}$ of the Z average particle diameter ($D_{DLS}$) to the average particle diameter ($D_{SEM}$) based on field emission scanning electron microscope imaging (FE-SEM imaging) of 2 or lower.

4. The powder material according to claim 1, wherein with the powder material dispersed in a medium, the powder material has a peak intensity in the peak particle size range of 0.1 μm to 2 μm in a particle size distribution based on an NNLS algorithm using the dynamic light scattering method of 80% or more of the total peak intensity based on scattering intensity.

5. The powder material according to claim 1, further comprising polyvinylpyrrolidone (PVP), wherein the PVP is also attached to the surface of the Ag—Pd core-shell particles.

6. A conductive paste comprising the powder material according to claim 1, and a medium for dispersing the powder material.

7. A method for manufacturing Ag—Pd core-shell particles consisting of Ag core particles containing silver as a principal constituent element and a Pd shell containing palladium as a principal constituent element covering at least part of the surface of the Ag core particles, the method comprising:

a step of preparing a first reaction solution containing a silver compound for constituting the Ag core particles;

a step of producing Ag core particles containing the silver contained in the first reaction solution as a principal constituent element by adding a first reducing agent to the first reaction solution to perform reduction treatment, wherein the first reducing agent contains at least hydroquinone;

a step of preparing a second reaction solution by adding a palladium compound for constituting the Pd shell to a dispersion solution of the resulting Ag core particles in a dispersed state; and a step of forming a Pd shell containing palladium as a principal constituent element on the surface of the Ag core particles in the second reaction solution by adding a second reducing agent to the second reaction solution to perform reduction treatment.

8. The manufacturing method according to claim 7, wherein the first reducing agent further includes polyvinylpyrrolidone (PVP).

9. The manufacturing method according to claim 8, wherein the first reducing agent is prepared as an alcohol solution by dissolving hydroquinone and PVP in an alcohol solvent, and the prepared first reducing agent is then added to the first reaction solution.

10. An Ag particle dispersion containing together a) Ag particles, b) at least one of hydroquinone and a quinone, and c) PVP; obtained by the reduction treatment performed by adding the first reducing agent containing PVP prepared by the manufacturing method according to claim 8.

11. A powder material comprising Ag particles obtained by the reduction treatment performed by adding the first reducing agent containing PVP prepared by the manufacturing method according to claim 8, wherein at least one of a) PVP and b) at least one of hydroquinone and a quinone is attached to the surface of the Ag particles.

* * * * *